UNITED STATES PATENT OFFICE.

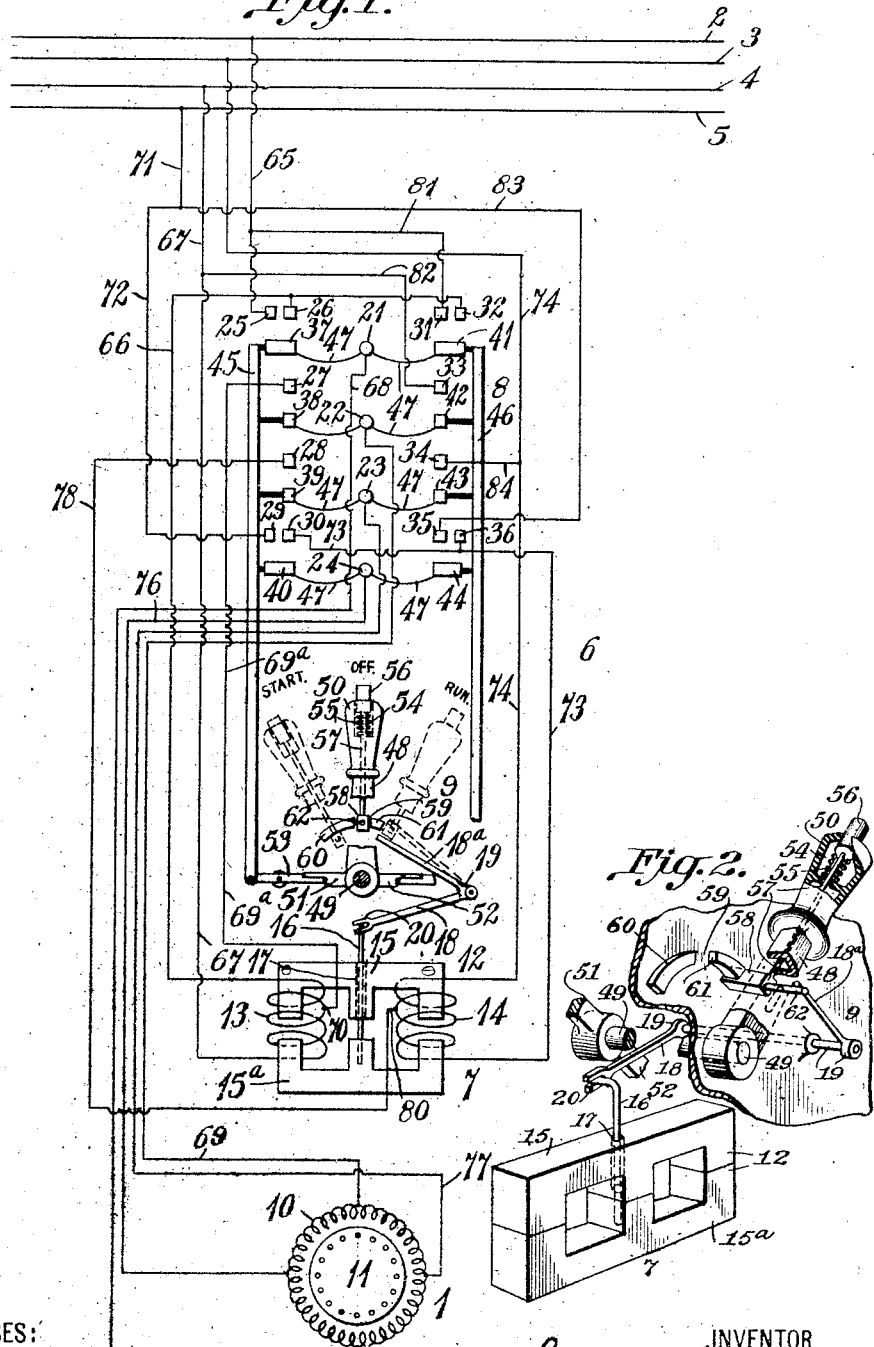

THEODORE VARNEY, OF PITTSBURGH, PENNSYLVANIA, ASSIGNOR TO WESTINGHOUSE ELECTRIC AND MANUFACTURING COMPANY, A CORPORATION OF PENNSYLVANIA.

CONTROLLER FOR ELECTRIC MOTORS.

1,036,754.    Specification of Letters Patent.    Patented Aug. 27, 1912.

Application filed January 7, 1911. Serial No. 601,826.

*To all whom it may concern:*

Be it known that I, THEODORE VARNEY, a citizen of the United States, and a resident of Pittsburgh, in the county of Allegheny and State of Pennsylvania, have invented a new and useful Improvement in Controllers for Electric Motors, of which the following is a specification.

My invention relates to controllers for electric motors, and it has special reference to auto-starters for polyphase induction motors.

The object of my invention is to provide a device of the above-indicated character which shall be simple and compact in construction and effective in operation and shall embody a split core structure having coöperating stationary and movable core members which are adapted to perform the double function of serving as the core structure for the usual auto-starter windings and also as an automatic no-voltage release mechanism.

Heretofore, provisions have been made for automatically releasing the operating handle of an auto-starter and for disconnecting the motor from the supply circuit conductors in case of a failure of voltage while the motor was running under normal conditions. However, such apparatus has always taken the form of auxiliary devices which have required additional space and attention and have necessarily increased expense and involved more or less complicated wiring.

According to my invention, I provide a split core structure for the usual auto-starter, one member of which is movable and normally separated from its coöperating stationary member and adapted to be brought into contact therewith when energy is first supplied to the auto-starter windings, in accordance with the usual manner of electromagnets. Upon the completion of the magnetic circuit, the customary auto-transformer action is established and the auto-starter serves its usual function in an old and familiar manner, whereby a reduced voltage is applied to the motor for starting purposes.

The operating handle of the switch, which is usually associated with an auto-starter, is biased to its central or neutral position and a restraining means is associated therewith for latching the handle in its full running position under normal conditions of voltage. If the voltage upon the auto-starter winding fails or is reduced sufficiently to allow the movable core member to drop into its normal position, the operating handle of the switching device is released and the switching device is opened, thereby disconnecting the motor from the supply circuit, so that no injurious results occur when line voltage is restored.

Figure 1 of the accompanying drawing is a diagrammatic view of a control system embodying a controller constructed in accordance with my invention, and Fig. 2 is a perspective view of the controller mechanism, parts being broken away.

Referring to the drawing in detail, a polyphase electric motor 1 receives energy from a polyphase supply circuit 2—3—4 and 5, through a controller or auto-starter 6 which comprises a peculiar type of auto-transformer 7, a switching device 8 and an operating mechanism 9. The motor 1 is a two-phase induction motor having a primary winding 10 and a rotor 11 of the squirrel-cage type and is constructed in a manner familiar to those skilled in the art.

The auto-transformer 7 comprises a split core structure 12 and sub-divided transformer windings 13 and 14, said core structure comprising a stationary member 15 and a movable member 15$^a$ which is normally separated from the stationary member and is adapted to be raised into engagement therewith when sufficient voltage is applied to transformer windings 13 and 14. A rod 16, which is rigidly connected to the movable core member 15$^a$, projects through an opening 17 in the stationary core member 15 and is operatively connected to an arm 18 of a pivotally mounted bell-crank lever 19 by means of a pin-and-slot connection 20.

The switching device 8 comprises a central row of stationary contact members 21, 22, 23 and 24, a plurality of parallel rows of stationary contact terminals 25 to 36, inclusive, and a plurality of parallel rows of coöperating movable contact terminals 37 to 44, inclusive. The movable contact terminals 37 to 40, inclusive, are rigidly mounted upon and insulated from a supporting rod 45 and are adapted to coöperate with the stationary contact terminals 25 to 30, inclusive, while the movable contact terminals 41 to 44, inclusive, are similarly mounted upon and insulated from a supporting rod 46 and are adapted to make coöperative engagement with the stationary contact terminals 31 to 36, inclusive. Each of the central stationary contact members 21 to 24, inclusive, is electrically connected to the adjacent movable contact terminal by means of a flexible conductor 47.

An operating lever 48 for the mechanism 9 is pivotally mounted upon a shaft 49 and is provided with an insulating handle 50 and laterally projecting arms 51 and 52. The laterally projecting arms 51 and 52 have sliding-pin-connections to the inner ends of pivotally mounted levers 53, the outer ends of which are pivotally connected to the lower ends of the respective supporting rods 45 and 46.

The construction of the sliding-pin-connection just referred to is such that movement of the supporting rods 45 and 46 is effected only by a downward movement of the arms 51 and 52, respectively. Thus, only one set of stationary and movable contact terminals may be closed at a time.

The handle 50 of the operating lever 48 is provided with a recess 54 to receive a coil spring 55 and a push button 56, which is attached to one end of a rod 57 having a block 58 secured to its other end. In the neutral position, the block 58 is adapted to rest in a notch 59 between segments 60 and 61. The segment 60 is relatively long for the purpose of precluding the possibility of locking the operating lever 48 in its left-hand or starting position, while the segment 61 is relatively short and is adapted to coöperate with and to lock the operating lever 48 in its right-hand or running position by reason of engagement with the block 58. It will be observed that a pin 62 is provided in the block 58 for a purpose to be hereinafter set forth.

Those skilled in the art will readily understand that the switching device 8 and the operating mechanism 9 are only illustrative of types of apparatus which are adapted to perform certain functions, and it is evident that any other suitable devices for accomplishing the same results may be employed. Furthermore, although the motor 1 and the auto-transformer 7 have been shown and described as adapted for two-phase operation, it will be understood that said pieces of apparatus may be constructed for three-phase operation as well.

Assuming that the motor 1 is at rest and the various circuit connections and devices occupy the positions shown, the operation of the system is as follows: In order to start the motor 1, the push button 56 is depressed against the action of spring 55, whereby the block 58 is released from the notch 59, after which the operating lever 48 is moved to its left-hand or starting position. Thus, the supporting rod 45 is raised to effect the engagement of its associated movable contact terminals with their coöperating stationary contact terminals, through the agency of the arm 51 and the lever 53, as will be readily understood. A circuit is thus completed from the supply circuit conductor 2, through a conductor 65, stationary contact terminal 25 and movable contact terminal 37, where the circuit divides: one branch including the stationary contact terminal 26, conductor 66, transformer winding 13, and conductor 67 to the supply circuit conductor 4, while the other branch traverses flexible conductor 47, stationary contact member 21, conductor 68, primary winding 10 of motor 1, conductor 69, stationary contact member 22, flexible conductor 47, movable contact terminal 38, stationary contact terminal 27 and conductor 69ª to an intermediate tap 70 in the transformer winding 13. Simultaneously, another circuit is established from supply circuit conductor 5, through conductor 71, conductor 72, stationary contact terminal 29 and movable contact terminal 40, where the circuit divides, one branch traversing stationary contact terminal 30, conductor 73, transformer winding 14 and conductor 74 to the supply circuit conductor 3, while the other branch includes flexible conductor 47, stationary contact member 24, conductor 76, a primary winding 10 of the motor 1, conductor 77, stationary contact terminal 23, flexible conductor 47, movable contact terminal 39, stationary contact terminal 28 and conductor 78 to an intermediate tap 80 in the transformer winding 14.

Upon the completion of the circuits just recited, energy is supplied to the transformer windings 13 and 14 and the movable core member 15ª is raised into engagement with its coöperating stationary core member 15, according to well-known principles, after which the usual auto-transformer action is established and energy is supplied to the induction motor 1 at a reduced voltage, as will be readily understood. As the movable core member 15ª is thus raised into contact with the stationary core member 15, the free end 18ª of the bell-crank lever 19 is raised into the position indicated in dotted lines through the agency of the rod 16 and the slot-and-pin connection 20. The motor 1 immediately starts and, after having gradually come up to synchronous speed, the operating lever 48 is quickly thrown into its right-hand or running position, thereby causing the movable contact terminals associated with the supporting rod 46 to engage their coöperating stationary contact terminals in a manner hereinbefore described in detail. As soon as the operating lever 48 is moved to its running position, the weight of the movable contact terminals associated with the supporting rod 45 causes said rod and associated contact terminals to fall to their normal positions, thereby effecting the separation of the coöperating stationary and movable contact terminals. In the running position, the spring 55 raises the block 58 into coöperative engagement with the segment 61, whereby the operating lever 48 is locked in position. In the running position of the operating lever 48, the pin 62 in the block 58 engages the under side of the arm 18ᵃ of the bell-crank lever 19 for a purpose to be hereinafter set forth.

As soon as the engagement of the movable contact terminals associated with the supporting rod 46 and their coöperating stationary contact terminals is effected, a circuit is established from the supply circuit conductor 2, through conductor 65, conductor 81, stationary contact terminal 31 and movable contact terminal 41, where the circuit divides; one branch including stationary contact terminal 32, conductor 66, transformer windings 13 and conductor 67 to the supply circuit conductor 4, while the other branch includes flexible conductor 47, stationary contact member 21, conductor 68, primary winding 10 of motor 1, conductor 69, stationary contact member 22, flexible conductor 47, movable contact terminal 42, stationary contact terminal 33, conductor 82, and conductor 67 to the supply circuit conductor 4. Another circuit is established from supply circuit conductor 5, through conductor 71, conductor 83, stationary contact terminal 35 and movable contact terminal 44, where the circuit divides; one branch traversing stationary contact terminal 36, conductor 73, transformer winding 14 and conductor 74 to the supply circuit conductor 3, and the other branch including flexible conductor 47, stationary contact member 24, conductor 76, primary winding 10 of motor 1, conductor 77, stationary contact member 23, flexible conductor 47, movable contact terminal 43, stationary contact terminal 34, conductor 84 and conductor 74 to the supply circuit conductor 3.

Inasmuch as the completion of the circuits just recited is effected almost instantly after the interruption of the circuits first established, the auto-transformer 7 is not deënergized and its movable core member 15ᵃ is retained in engagement with the stationary core member 15. It will be understood the energy is still supplied to the transformer windings 13 and 14 and the motor connections to said transformer windings have been changed, whereby full line voltage is impressed upon the motor 1 and full running conditions are obtained.

If, for any reason, the voltage upon the transformer windings 13 and 14 fails, the core structure 12 is deënergized and the movable core member 15ᵃ is allowed to fall to its normal position, thereby transmitting its motion through the rod 16, bell-crank lever 19 and pin 62 to the block 58 which is forced downwardly out of engagement with the segment 61, after which the weight of the movable contact terminals associated with the rod 46 causes the operating lever 48 to be returned to its middle or neutral position, as will be readily understood.

Thus it is seen that, according to my invention, I utilize the split core structure as the magnetizable element of the auto-transformer 7 and as an automatic no-voltage release.

Structural modifications may be effected in the various pieces of apparatus hereinbefore shown and described, and I desire that only such limitations shall be imposed as are indicated in the appended claims.

I claim as my invention:

1. In a controller for electric motors, the combination with a magnetizable core structure comprising a stationary and a movable member, energizing windings for said core structure, a switching device, and means for restraining said switching device in its closed position, of means associated with said movable core member for releasing said restraining means under predetermined voltage conditions.

2. An auto-starter for electric motors comprising coöperating stationary and movable core members, energizing windings therefor, a switching device to control the circuit connections of said windings and said motor, and means for restraining said switching device in its closed position, and means dependent upon the movement of said movable core member for releasing said restraining means.

3. The combination with an electric motor, a supply circuit, an auto-transformer having a stationary and a movable core member, and a switching device for controlling the circuit connections of said motor and said auto-transformer, of mechanical means associated with said movable core member for opening said switching device upon the deënergization of said auto-transformer.

4. An auto-transformer comprising a core structure having a stationary member and a normally separated movable member, an energizing winding for said core structure, a switching device for controlling the circuit connections to said energizing winding, and means associated with said movable core member for opening said switching device when said movable core member occupies its normal position.

5. The combination with an auto-starter for electric motors comprising a stationary and a movable core member, and exciting windings therefor, of a switching mechanism adapted to control the circuit connections of said exciting windings, an operating handle for said switching mechanism, means for locking said handle in its running position, and means dependent upon the position of said movable core member for releasing said locking means.

6. The combination with an induction motor, a supply circuit and a switching device for controlling the connections of said motor, of an auto-starter for decreasing the voltage applied to said motor during the starting operation and comprising normally separated coöperating stationary and movable core members, energizing windings therefor having intermediate taps therein, and means associated with said movable core and dependent upon the failure of voltage upon said energizing windings for opening said switching device.

7. In a controller for an electric motor, the combination with an auto-transformer having a core structure, energizing windings therefor, and a switching device for controlling the circuit connections of said transformer, of a magnetizable and movable member forming a part of said core structure and dependent for magnetization upon said energizing windings, and means associated with said movable member for releasing said switching device under predetermined electrical conditions of said energizing windings.

8. The combination with a magnetizable core structure and energizing windings therefor, of a switching device to control the circuit connections of said windings, means for locking said switching device closed under normal circuit connections, and means associated with said core structure for releasing said locking means under predetermined circuit conditions.

9. An auto-starter for electric motors, comprising a magnetizable core structure, energizing windings therefor, a switching device to control the connections of said windings, means for locking said switching device closed, and means whereby said core structure and windings serve as a no-voltage release for said switching device.

10. The combination with a supply circuit, an induction motor and a transforming device for reducing the voltage applied to said motor during starting, of a switching device for controlling the circuit connections of said motor and said transformer device and adapted to be restrained in its running position and means whereby said transforming device serves to release said switching device under predetermined conditions of said supply circuit.

In testimony whereof, I have hereunto subscribed my name this 30th day of Dec. 1910.

THEODORE VARNEY.

Witnesses:
C. G. TARKINGTON,
B. B. HINES.